Oct. 18, 1932.    G. A. RHUE    1,882,909

EYEGLASS LENS

Filed Jan. 8, 1929

Inventor

George A. Rhue

Patented Oct. 18, 1932

1,882,909

UNITED STATES PATENT OFFICE

GEORGE A. RHUE, OF SAN DIEGO, CALIFORNIA

EYEGLASS LENS

Application filed January 8, 1929. Serial No. 331,147.

My invention relates to lenses for eye glasses, either the ordinary glasses or goggles of the various types.

The object of my invention is:

To provide a lens of this type in which the light is limited through certain portions of the lens so that it is distributed evenly on both eyes and does not admit too much light to the eye.

Figure 1:
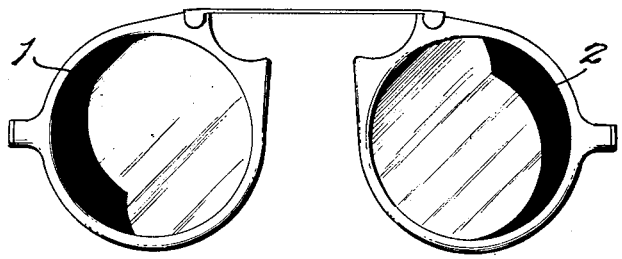
Figure 2:
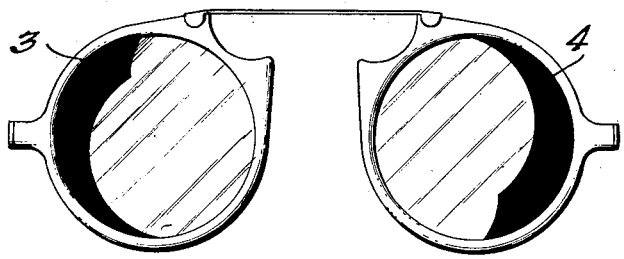

With this and other objects in view as will appear hereinafter, my invention consists of certain novel features of construction, combination and arrangement of parts and portions as will be hereinafter described in detail and particularly set forth in the appended claim, reference being had to the accompanying drawing and to the characters of reference thereon which form a part of this application, in which:

Figure 1 is a front elevational view of eye glasses showing the contracted portions at the sides, thick at the upper side on one lens, and thick at the lower side on the opposite lens; Fig. 2 is a similar view showing these in the reverse position; and Fig. 3 is a similar view showing these portions in crescent shape instead of gradually broadening on opposite sides as in Figs. 1 and 2.

Similar characters of reference refer to similar parts and portions throughout the several views of the drawing.

It will be noted that these reducing portions are opaque surfaces on the edge of the lens and may be placed either on the outside or inside of the lens. When placed on the outside of a flat planolens, they provide reflecting magnifying surfaces; they also increase the size of objects placed from three to six inches from the right or left ear, so that they may be read readily by persons who have reached the age where the reflection should be magnified.

Figure 3:
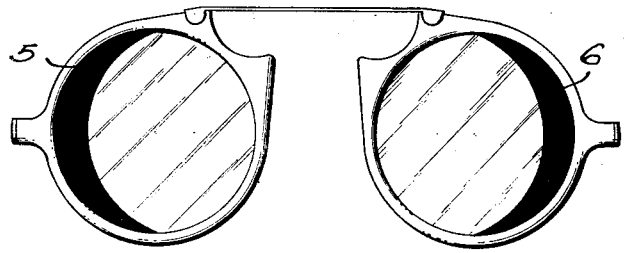

The opaque surfaces 1 and 2, 3 and 4, and 5 and 6, consist of black paint or lamp black ground in oil varnish and japan, and may be placed on the inner or outer side of the lens and at the outer edge thereof, and may be positioned as shown in Fig. 1 by the characters 1 and 2, or as shown in Fig. 2 by the characters 3 and 4, in reverse position, or in crescent shaped form, as shown in Fig. 3, designated by 5 and 6.

Having thus described my invention, what I claim as new and desire to secure by Letters Patent is:

In eye glasses, a pair of lenses, opaque covering oppositely disposed on the outer side edges of said lenses, each covering gradually increasing in width in one direction only from end to end, so positioned relatively that one is wide at the upper side of the lens, and the other is wide at the lower side of the lens.

GEORGE A. RHUE.